124,315

UNITED STATES PATENT OFFICE.

CYRUS B. AYER, OF BELOIT, WISCONSIN, ASSIGNOR TO ISRAEL WILLIAMS, OF SAME PLACE.

IMPROVEMENT IN PAPER-BOARDS FOR BUILDINGS.

Specification forming part of Letters Patent No. 124,315, dated March 5, 1872.

SPECIFICATION.

Specification describing a new Process for making Building-Paper (or paper used for building purposes) Water-Proof, invented by CYRUS B. AYER, of the city of Beloit, in the county of Rock and State of Wisconsin.

Pass the plain building-paper, or paper used for building purposes, after its manufacture or while in the process of being manufactured, first through a solution, stronger or weaker, of salts, either of iron or zinc, or a mixture of these salts, the sulphates of these bases being preferred; and next through a sizing composed of one part soft-soap, (made of fat, potassa, and water,) and one part water; or through a sizing, composed as above, and glue mixed, the solution of glue to be four parts water and one part glue, and when these solutions are mixed before being used, to be composed of a greater or less quantity of the one and the other solutions, according to the quality of paper being made by the process described. The insoluble salts of the fatty acids with the metallic base or bases, used as above described, form and combine in the texture of the paper, rendering it damp and water proof.

I claim as my invention—

The process of rendering building-paper, or paper used for building purposes, water and damp proof, by passing it through a solution, stronger or weaker, of salts either of iron or zinc, or a mixture of these salts, the sulphates being preferred, and next through a sizing, substantially as described.

CYRUS B. AYER.

Witnesses:
A. C. McPHERSON,
C. F. RAU, Jr.